United States Patent
Yoshinaga

(10) Patent No.: US 9,387,561 B2
(45) Date of Patent: Jul. 12, 2016

(54) SCREW FASTENING DEVICE

(71) Applicant: FANUC CORPORATION, Yamanashi (JP)

(72) Inventor: Toshimichi Yoshinaga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 58 days.

(21) Appl. No.: 14/451,872

(22) Filed: Aug. 5, 2014

(65) Prior Publication Data

US 2015/0047471 A1  Feb. 19, 2015

(30) Foreign Application Priority Data

Aug. 16, 2013 (JP) ................................ 2013-169128

(51) Int. Cl.
 *B23P 19/06* (2006.01)
 *B25H 1/00* (2006.01)
 *B25B 21/00* (2006.01)

(52) U.S. Cl.
 CPC ................ *B23P 19/06* (2013.01); *B25B 21/00* (2013.01); *B25H 1/0021* (2013.01); *Y10S 901/41* (2013.01); *Y10S 901/46* (2013.01)

(58) Field of Classification Search
 CPC ..... B23P 19/06; B25B 21/00; B25B 23/0078; B25B 21/004; B25B 21/005; B25B 13/466; B25H 1/0021; B25H 1/0028; Y10S 901/41; Y10S 901/46
 See application file for complete search history.

(56) References Cited

U.S. PATENT DOCUMENTS

| | | | | |
|---|---|---|---|---|
| 4,043,365 A | * | 8/1977 | York | B23P 19/06 192/93 C |
| 4,573,271 A | * | 3/1986 | Hamilton | B23P 19/04 33/558 |
| 4,782,726 A | * | 11/1988 | Ryder | B23P 19/06 81/57.24 |
| 2010/0242690 A1 | * | 9/2010 | Tohyama | B23P 19/06 81/451 |

FOREIGN PATENT DOCUMENTS

| | | |
|---|---|---|
| CN | 103056646 | 4/2013 |
| JP | 63-46232 | 11/1983 |
| JP | 2002331428 | 11/2002 |
| JP | 2010-012583 | 1/2010 |
| JP | 2012-091236 | 5/2012 |

OTHER PUBLICATIONS

Japanese Office Action dated Nov. 25, 2014, Japanese Appl. No. 2013-169128.

* cited by examiner

*Primary Examiner* — Robert Scruggs
(74) *Attorney, Agent, or Firm* — RatnerPrestia

(57) ABSTRACT

A screw fastening device (10) includes a base part (11), an extended part (12) with one end (12a) which is attached to the base part in a pivotable manner, a tool part (13) which is fastened to another end (12) of the extended part and makes a screw which is engaged with its front end rotate, a pushing mechanism (15) which pushes the tool part against the screw (14) through the extended part in an axial direction of the screw, a guide part (16) which is fastened to the base part and has an arc shaped part, a torque generating part (17) which generates a torque which makes the extended part rotate along the arc shaped part in a fastening direction of the screw, and a first detection part (18a) which detects when a reaction force of a predetermined value or more acts against the torque generating part.

8 Claims, 8 Drawing Sheets

SCREW FASTENING DEVICE

BACKGROUND OF THE INVENTION

1. Field of the Invention

The present invention relates to a screw fastening device which automatically fastens a screw by operation of a robot, etc.

2. Description of the Related Art

A nut runner is used to detect fastening torque and controls torque for the purpose of improving the reliability of machinery and structures. Japanese Examined Utility Model Publication No. 63-46232U discloses a nut runner which is provided with a torque detector.

Furthermore, Japanese Patent Publication No. 2010-012583A discloses a device which is provided with a fastening operation monitoring means for monitoring a fastening operation force when a hand of a robot fastens a wrench.

A general nut runner such as disclosed in Japanese Examined Utility Model Publication No. 63-46232U uses a built in motor to turn the front end of a tool which is arranged on its axis. For this reason, a relatively large space is considered necessary in front of the nut etc. to be fastened. If such a space cannot be secured, it is necessary to build an offset gear etc. inside the nut runner.

However, since such a gear is used for transmitting a torque, it is difficult to make the gear small in size. For this reason, the nut runner with such a built-in gear tends to become large in size as a result. Further, when the above-mentioned space cannot be secured, it is necessary to lower the upper limit of the fastening torque. Further, automation of the nut runner itself is difficult.

Furthermore, the fastening operation monitoring means which is disclosed in Japanese Patent Publication No. 2010-012583A is a strain gauge, so there is also the problem that the cost of the device as a whole becomes high.

The present invention was made in consideration of this situation and has as its object to provide an inexpensive screw fastening device which can automate the fastening work even when only a limited space can be secured.

SUMMARY OF INVENTION

To achieve the above-mentioned object, according to a first aspect, there is provided a screw fastening device comprising a base part, an extended part with one end which is attached to the base part in a pivotable manner, a tool part which is fastened to another end of the extended part and makes a screw which is engaged with its front end rotate, a pushing mechanism which pushes the tool part against the screw through the extended part in an axial direction of the screw, a guide part which is fastened to the base part and has an arc shaped part, a torque generating part which generates a torque which makes the extended part rotate along the arc shaped part in a fastening direction of the screw, and a first detection part which detects when a reaction force of a predetermined value or more acts against the torque generating part.

According to a second aspect, there is provided the first aspect where the pushing mechanism is an air cylinder.

According to a third aspect, there is provided the first aspect where the pushing mechanism is a spring.

According to a fourth aspect, there is provided any one of the first to third aspects which is provided with a second detection part which detects when the tool part is engaged with the screw due to the pushing action of the pushing mechanism.

According to a fifth aspect, there is provided any one of the first to fourth aspects where the screw fastening device is attached to the front end of a robot.

According to a sixth aspect, there is provided any one of the first to fifth aspects where the torque generating part is an air cylinder which uses controlled air pressure.

According to a seventh aspect, there is provided any one of the first to fifth aspects where the torque generating part is an air cylinder which uses a plurality of air pressures which are controlled by an air pressure switching device.

According to an eighth aspect, there is provided any one of the first to fifth aspects where the torque generating part is a servo motor which is controlled by a robot controller.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
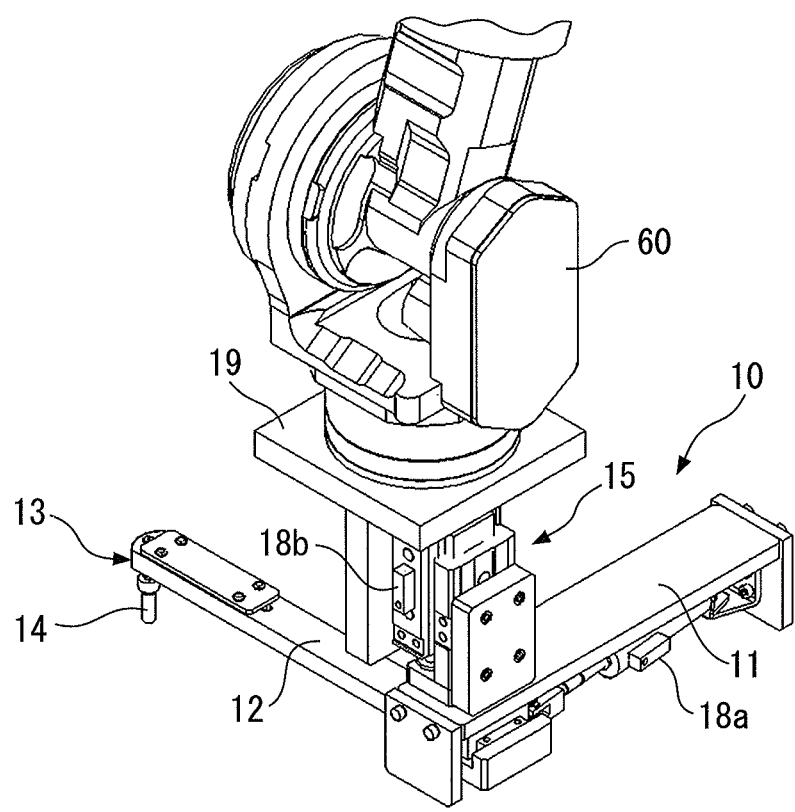
FIG. 1 is a perspective view of a screw fastening device according to the present invention.
Figure 2:
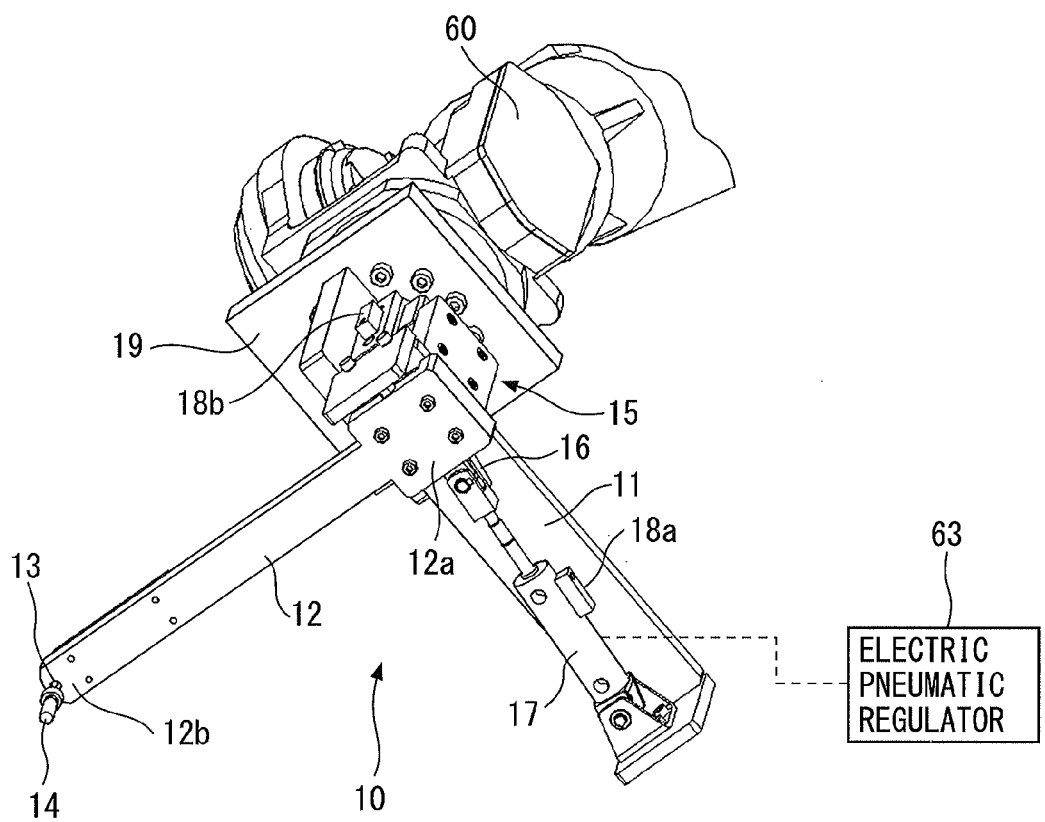
FIG. 2 is a perspective view of the screw fastening device which is shown in FIG. 1 as seen from the bottom surface side.

FIG. 1 is a perspective view of a screw fastening device according to the present invention, while FIG. 2 is a perspective view of the screw fastening device shown in FIG. 1 as seen from the bottom surface side. A screw fastening device 10 which are shown in FIG. 1 and FIG. 2 is attached through a plate 19 to a wrist front end of a robot 60. The robot 60 is for example a vertical multiarticulated robot, but may be another type of robot.

Such a robot 60 performs the role of placing the screw fastening device 10 of the present invention at a desired position and orientation. Therefore, in the present invention, it is possible to use the screw fastening device 10 over a broad range so the fastening direction of the screw is kept from being limited.

As shown in FIG. 1 and FIG. 2, the screw fastening device 10 includes a plate 19 which is attached to the robot 60 and a base part 11. Between the plate 19 and the base part 11, a later explained pushing mechanism 15 is provided. In the illustrated embodiment, the base part 11 is an elongated metal plate. One end 12a of the extended part 12 is pivotably attached to the base part 11.

In the embodiment which is shown in FIG. 1 and FIG. 2, the extended part 12 is an elongated shape member which is slightly longer than the base part 11. Further, at the other end 12b of the extended part 12, a tool part 13 for turning a screw 14 is arranged. In FIG. 1 and FIG. 2, the head of the screw 14 is already engaged with the front end of the tool part 13. Further, the screw 14 is engaged with the tool part 13 so that the axial direction of the screw 14 is vertical to the length part of the extended part 12 and becomes the same as the pushing direction of the pushing mechanism 15.

The pushing mechanism 15 which is shown in FIG. 1 and FIG. 2 is an air cylinder. The pushing mechanism 15 performs the role of pushing the tool part 13 against the screw 14 through the extended part 12 in the axial direction of the screw 14. If the extended part 12 is turned around the tool part 13 in the state with the front end of the tool part 13 pushed against the head of the screw 14, the tool part 13 engages with the head of the screw 14. The engagement detection part 18b which is provided at the side surface of the pushing mechanism 15 detects that the tool part 13 is engaged with the screw 14 based on the position of a rod of the pushing mechanism 15.

As shown in FIG. 1 and FIG. 2, when the pushing mechanism 15 is an air cylinder, the tool part 13 is pushed against the screw 14 by a certain force. Further, the pushing mechanism 15 may be a spring (not shown). In this case, the screw fastening device 10 can be provided extremely inexpensively.

Figure 3:
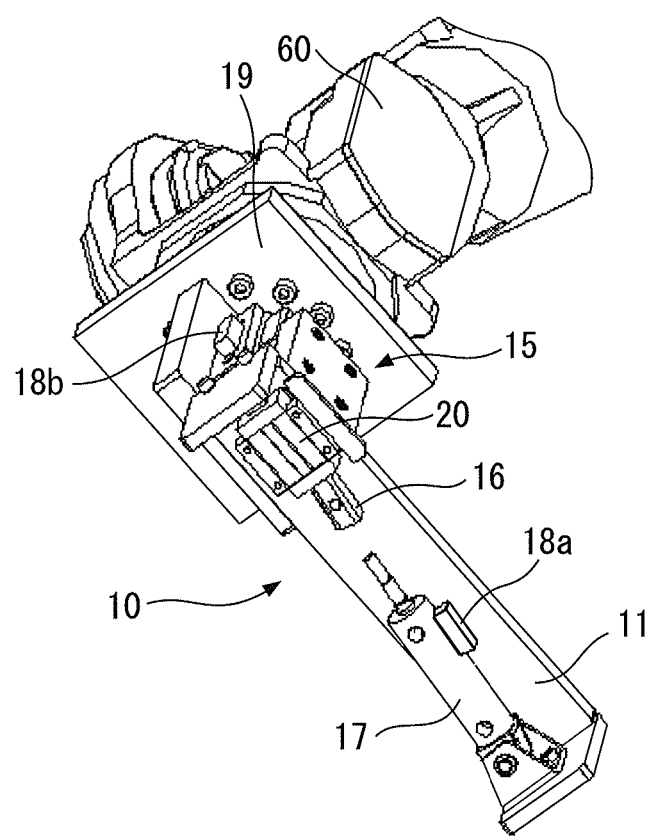
FIG. 3 is a perspective view of a screw fastening device in the state eliminating the extended part as seen from the bottom surface side.
Figure 4:
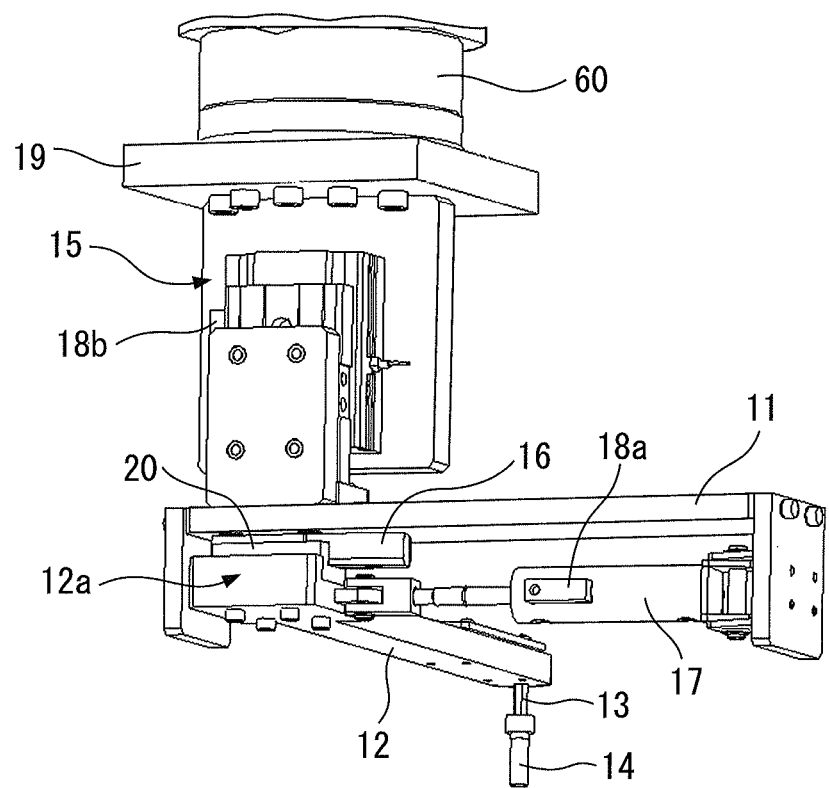
FIG. 4 is a perspective view of a screw fastening device as seen from the side.

FIG. 3 is a perspective view of the screw fastening device in the state eliminating the extended part and as seen from the bottom surface side. FIG. 4 is a perspective view of a screw fastening device as seen from the side. As can be seen from FIG. 3 and FIG. 4, a guide part 16 is fastened to the bottom surface of the base part 11. The guide part 16 is formed so that the long side surface has an arc shaped part. Furthermore, the guide block 20 is engaged with the guide part 16 to be able to slide. The guide block 20 is connected to one end 12a of the extended part 12 and pivots integrally with the extended part 12.

As can be particularly seen from FIG. 4, at the bottom surface of the base part 11, a torque generating part 17 is provided. The front end of the rod of the torque generating parts 17 is a link mechanism. The link mechanism engages with the extended part 12 by a pin near one end 12a of the extended part 12.

The illustrated torque generating part 17 is an air cylinder which uses controlled air pressure. For this reason, the torque detection part 18a which is attached to the side surface of the torque generating part 17 can detect the torque easily and inexpensively. The torque detection part 18a may also for example be a lead switch.

Alternatively, the torque generating part 17 may be an air cylinder which uses a plurality of air pressures controlled by a not shown air switching device. In this case, it is possible to suitably switch the air pressure to adjust the fastening torque. The air pressure switching device for example may be an electric pneumatic regulator 63 which is shown in FIG. 2.

Figure 5:
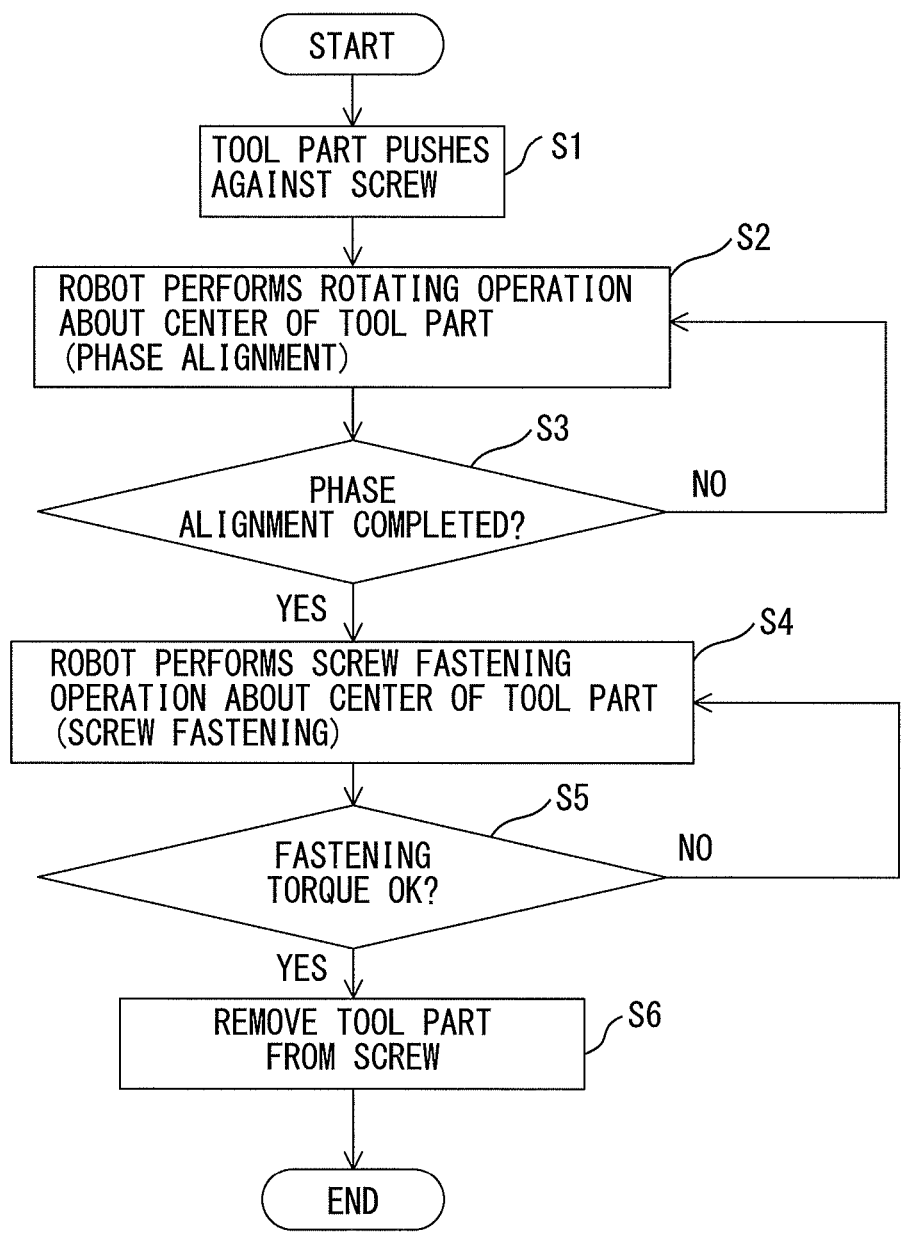
FIG. 5 is a flow chart which shows the operation of a screw fastening device according to the present invention.
Figure 6:
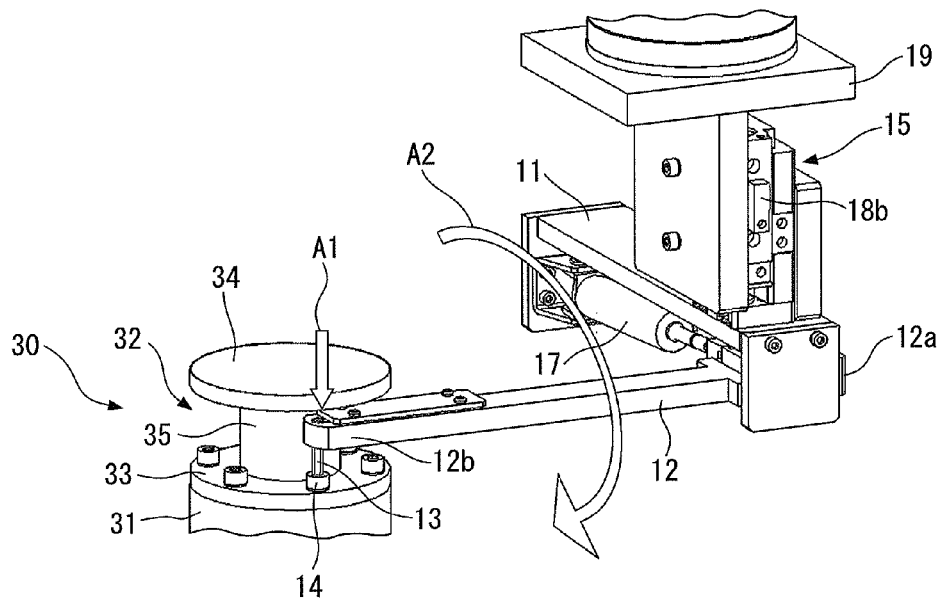
FIG. 6 is a first perspective view which shows a phase alignment operation.
Figure 7:
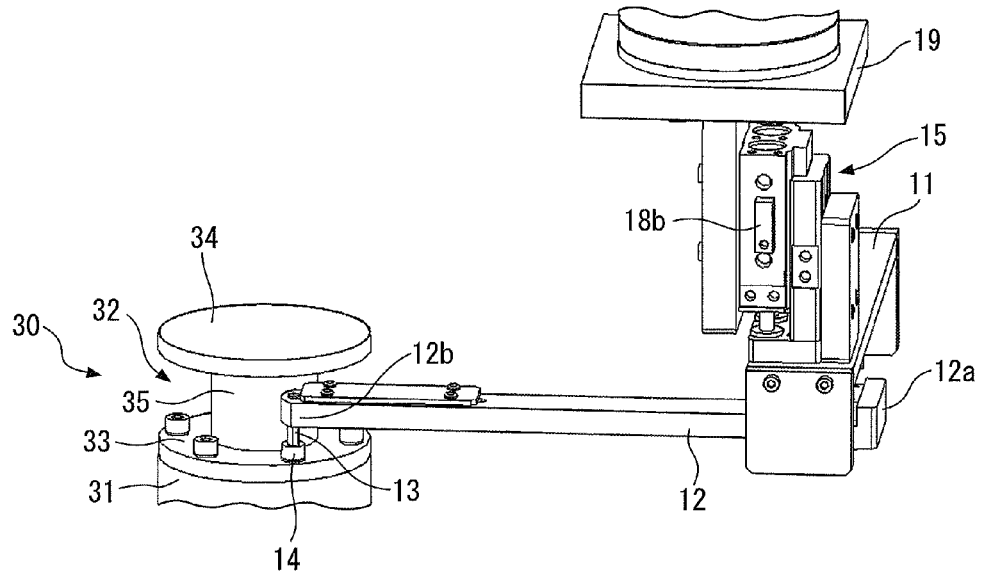
FIG. 7 is a second perspective view which shows a phase alignment operation.
Figure 8:
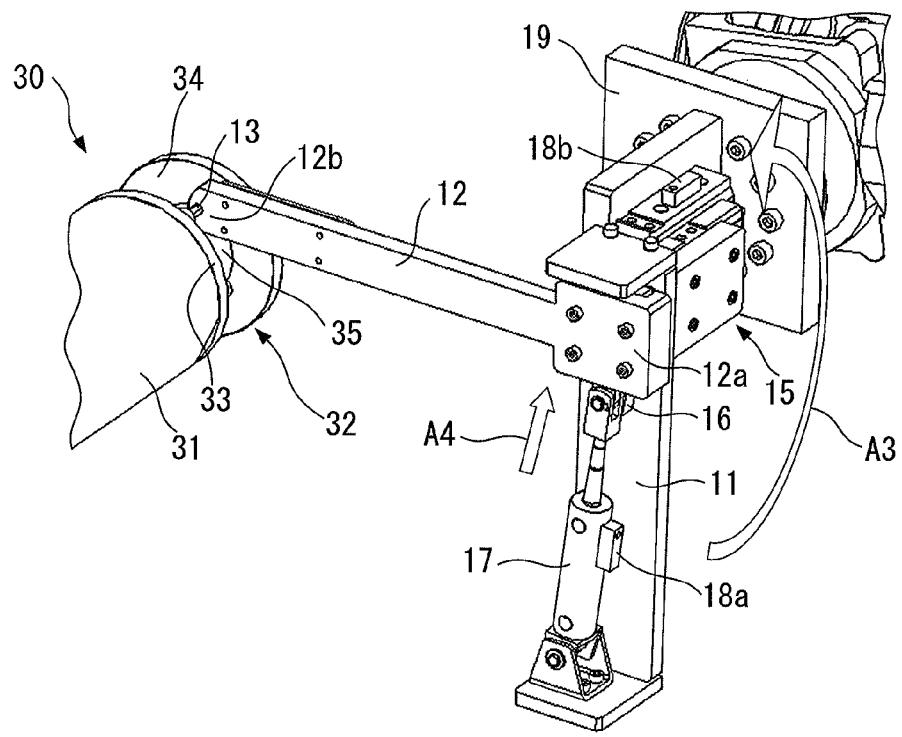
FIG. 8 is a first perspective view which shows a fastening operation.
Figure 9:
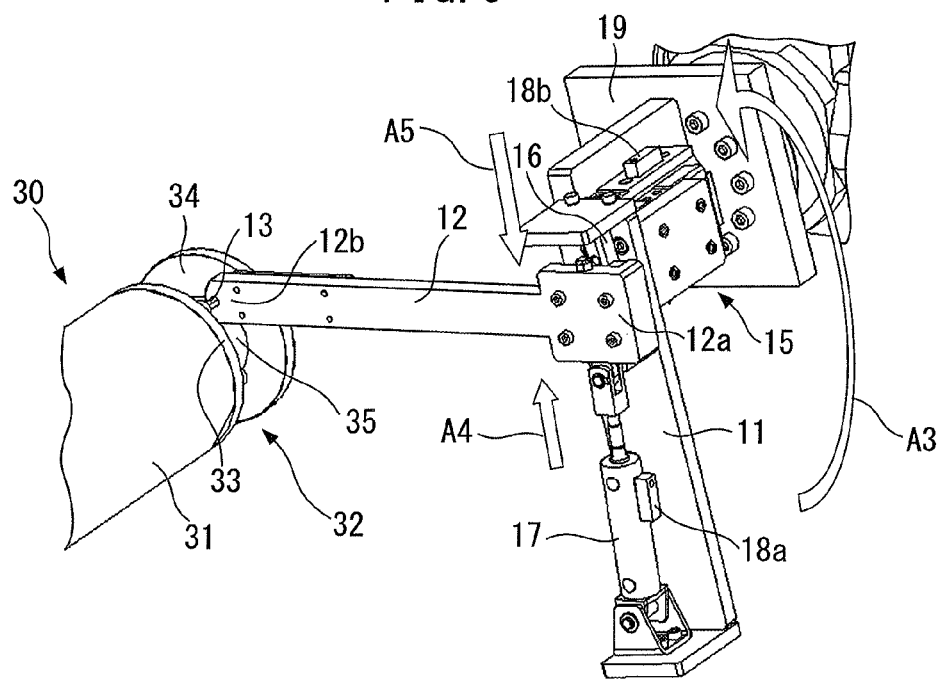
FIG. 9 is a second perspective view which shows a fastening operation.

FIG. 5 is a flow chart which shows the operation of the screw fastening device according to the present invention. Furthermore, FIG. 6 and FIG. 7 are perspective views which show a phase alignment operation, while FIG. 8 and FIG. 9 are perspective views which show a fastening operation. A workpiece 30 which is shown from FIG. 6 to FIG. 9 is comprised of a tubular workpiece body 31 and a reel member 32 which is attached to an end face of the workpiece body 31.

As shown in FIG. 6 and FIG. 7, the reel member 32 contains two end plates 33 and 34 and a center shaft 35 which connects these end plates 33 and 34. As can be seen from the figures, the diameter of the end plate 33 is substantially equal to the diameter of the end face of the workpiece body 31. Further, as can be seen from FIG. 6, the center shaft 35 is relatively short, but has a length of an extent in which the other end 12b of the extended part 12 and tool part 13 can be inserted.

Further, in the following embodiments, the tool part 13 of the screw fastening device 10 is a hexagonal wrench key. The head of the screw 14 has a corresponding hexagonal hole formed in it. However, even if employing other configurations of the tool part 13 and screw 14, this would be included in the scope of the present invention. Further, the end faces of the end plate 33 and workpiece body 31 are formed with pluralities of holes which correspond to the screws 14. These holes are formed with female threads.

Below, while referring to FIG. 5 to FIG. 9, the screw fastening work when using the screw fastening device 10 of the present invention to fasten one end plate 33 of the reel member 32 to the end face of the workpiece body 31 by screws will be explained. Note that, the reel member 32 is already suitably arranged at the end face of the workpiece body 31. The plurality of holes of the end plate 33 and the holes of the end face of the workpiece body 31 corresponding to these holes of the end plate 33 have screws 14 inserted into them in advance.

First, in FIG. 5, at step S1, the robot 60 is made to move from the original position so as to position the front end of the tool part 13 to right above one screw 14 inserted into the end plate 33. In the present invention, it is sufficient to insert only one end 12b of the extended part 12 and tool part 13 in the space between the end plates 33 and 34. There is no need for inserting the front end of the wrist of the robot 60 itself into this space. For this reason, in the present invention, even if only the minimum extent of space enabling insertion of the tool part 13 can be secured, the later explained phase alignment work and screw fastening work can be performed.

Then, as shown in FIG. 6 by the arrow A1, the pushing mechanism 15 is driven to push the tool part 13 against the screw 14 by a predetermined force. At this time, the tool part 13 is just simply pushed against the screw 14, so the front end of the tool part 13 is not inserted into the hole of the head of the screw 14.

Then, at step S2, the robot 60 is made to rotate about the tool part 13. Due to this, as shown in FIG. 6 by the arrow A2, the screw fastening device 10 turns about the tool part 13. If making the screw fastening device 10 turn in this way, the front end of the tool part 13 naturally drops into the hole of the head of the screw 14.

The tool part 13 which is shown in FIG. 7 is shorter than the tool part 13 which is shown in FIG. 6, so in FIG. 7, it will be understood that the front end of the tool part 13 drops into the hole of the screw 14. In the present invention, by turning the screw fastening device 10, the tool part 13 engages with the screw 14. Due to this, the phase alignment work can be automatically performed.

When the front end of the tool part 13 drops into the hole of the screw 14, the rod of the pushing mechanism 15 (in this case, air cylinder) extends in the downward direction by exactly a predetermined amount. The engagement detection part 18b which is attached to the pushing mechanism 15 detects such a change. When it is judged at step S3 that the rod extends in the downward direction, it can be judged that the tool part 13 has engaged with the hole of the screw 14 and the phase alignment has been completed. Such judgment is deemed performed every predetermined period. When it is not judged that the rod has extended in the downward direction, the routine proceeds to step S3 where the screw fastening device 10 is made to further turn. In this way, in the present invention, it can be confirmed that the tool part 13 has engaged with the screw 14, so the later explained fastening work can be stably and reliably performed.

Then, at step S4, as shown in FIG. 8 by the arrow A3, the robot 60 is made to rotate about the tool part 13. The rotational direction at this time is the same as the fastening direction of the screw 14. Due to this, the extended part 12 also rotates together with the robot 60 and starts to fasten the screw 14. At that time, as shown by the arrow A4, the torque generating part 17 generates a certain torque so that the extended part 12 rotates along the arc shaped part of the guide part 16 in the fastening direction of the screw 14.

If the screw 14 is roughly fastened, as shown in FIG. 9 by the arrow A5, a reaction force acts due to the. fastening. Due to this, the extended part 12 moves in the direction of the arrow A5 along the arc shaped part of the guide part 16, and the torque which is detected by the torque detection part 18a which is attached to the torque generating part 17 rises. During this time as well, the robot 60 can continue to move in the arrow A3 direction and fasten the screw 14 more.

Further, at step S5, referring to the torque detection value of the torque detection part 18a, it is judged if the torque detection value is larger than a predetermined value. If the torque detection value is not larger than a predetermined value, the routine returns to step S4.

As opposed to this, when the torque detection value is larger than a predetermined value, it can be judged that a sufficient fastening torque is obtained. Therefore, in such a case, the fastening work is stopped and the routine proceeds to step S6. At step S6, the pushing action of the pushing mechanism 15 is made to stop. Further, the robot 60 is made to move to make the tool part 13 separate from the screw 14. Finally, the robot 60 is returned to the initial position and the processing is ended.

By employing the extended part 12 in the present invention in this way, even if only the minimum extent of space enabling insertion of the tool part 13 can be secured, the extended part 12 can be made to enter such a space to perform the fastening work. Further, when a reaction force of a predetermined value or more acts on the torque generating part 17, the fastening work is stopped. For this reason, in the present invention, the series of steps of the fastening work as a whole which are shown in FIG. 5 can be automated. Further, in the present invention, it is not necessary to use a strain gauge etc., so a small-sized screw fastening device can be inexpensively provided.

Figure 10:
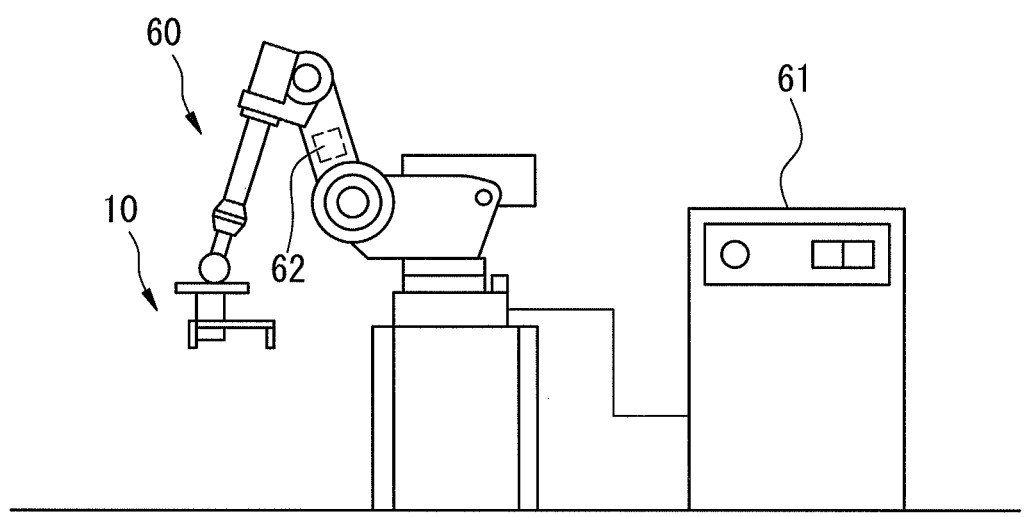
FIG. 10 is a schematic view of a robot system which includes a screw fastening device according to the present invention.

Further, as shown in FIG. 10 which is a schematic view of a robot system including a screw fastening device according to the present invention, the robot 60 is controlled by the robot controller 61. In a certain embodiment, the torque generating part 17 may also be a servo motor 62 of a robot 60 which is controlled by the robot controller 61. In this case, the torque generating part 17 is controlled by the robot controller 61, so it will be understood that the robot controller 61 can be used to change and detect the fastening torque.

Advantageous Effects of Invention

In the first aspect, an extended part is employed, so the fastening work can be performed even if only the minimum extent of space enabling entry of the tool part can be secured.

Further, when a reaction force of a predetermined value or more acts on the torque generating part, the fastening work is stopped and as a result the fastening work can be automated. Furthermore, such a screw fastening device does not have to use a strain gauge etc., so a small sized screw fastening device can be inexpensively provided.

In the second aspect, the pushing mechanism is an air cylinder, so the tool part can be pushed against the screw by a certain force.

In the third aspect, the pushing mechanism is a spring, so the screw fastening device can be made further cheaper.

In the fourth aspect, it is possible to confirm that the tool part engages with the screw, so stable fastening work becomes possible.

In the fifth aspect, it is possible to use the screw fastening device over a broad range. Furthermore, it is possible to perform fastening work without being limited as to the fastening direction.

In the sixth aspect, the torque generating part uses controlled air pressure, so it is possible to detect the torque cheaply.

In the seventh aspect, the torque generating part uses a plurality of controlled air pressures, so it is possible to suitably switch the air pressure to adjust the fastening torque. The air pressure switching device is for example an electric pneumatic regulator.

In the eighth aspect, torque generating part is controlled by the robot controller, so the robot controller can be used to change and detect the fastening torque.

Typical embodiments were used to explain the present invention, but a person skilled in the art would understand that the above-mentioned changes and various other changes, deletions, and additions may be made without departing from the scope of the present invention.

What is claimed is:

1. A robot system comprising:
   a robot; and
   a screw fastening device which is attached to a front end of the robot;
   wherein the screw fastening device includes;
   (i) a base part which is fixed to the front end of the robot,
   (ii) an extended part with one end which is attached to said base part in a pivotable manner,
   (iii) a tool part which is fastened to another end of said extended part and is configured to rotate a screw,
   (iv) a pushing mechanism which pushes said tool part against said screw through said extended part in an axial direction of said screw,
   (v) a guide part which is fastened to said base part, and
   (vi) a torque generating part which generates a torque which makes said extended part rotate along said guide part in a radial fastening direction of said screw,
   wherein, in a screw fastening operation, when the robot is made to rotate about the tool part in the radial fastening direction, the torque generating part generates a certain torque so that the extended part rotates along the guide part in the radial fastening direction of the screw thereby rotating the tool part and the screw that is pushed against said tool part.

2. The robot system according to claim 1 wherein said pushing mechanism is an air cylinder.

3. The robot system according to claim 1 wherein said pushing mechanism is a spring.

4. The robot system according to claim 1 which is provided with a first detection part which detects when said tool part is engaged with said screw due to the pushing action of said pushing mechanism.

5. The robot system according to claim 1 wherein said torque generating part is an air cylinder which uses controlled air pressure.

6. The robot system according to claim 1 wherein said torque generating part is an air cylinder which uses a plurality of air pressures which are controlled by an air pressure switching device.

7. The robot system according to claim 1 wherein said torque generating part is a servo motor which is controlled by a robot controller.

8. The robot system according to claim 1, wherein the screw fastening device further including a first detection part which is provided with the torque generating part and which detects when a reaction force of a predetermined value or more acts;
    wherein if the first detection part detects when the reaction force of the predetermined value or more acts, the screw fastening operation is stopped.

\* \* \* \* \*